(12) United States Patent
Dournes et al.

(10) Patent No.: US 11,361,429 B2
(45) Date of Patent: Jun. 14, 2022

(54) METHOD FOR GEOMETRICAL CHARACTERISATION OF THE AIRWAYS OF A LUNG BY MRI

(71) Applicants: UNIVERSITE DE BORDEAUX, Bordeaux (FR); L'INSTITUT POLYTECHNIQUE DE BORDEAUX, Talence (FR); CENTRE HOSPITALIER UNIVERSITAIRE DE BORDEAUX, Talence (FR); CENTRE NATIONAL DE LA RECHERCHE SCIENTIFIQUE (CNRS), Paris (FR); INSTITUT NATIONAL DE LA SANTE ET DE LA RECHERCHE MEDICALE, Paris (FR)

(72) Inventors: Gael Dournes, Bordeaux (FR); Fabien Baldacci, Pessac (FR); François Laurent, Bordeaux (FR); Patrick Berger, Mérignac (FR)

(73) Assignees: UNIVERSITE DE BORDEAUX, Bordeaux (FR); L'INSTITUT POLYTECHNIQUE DE BORDEAUX, Talence (FR); CENTRE HOSPITALIER UNIVERSITAIRE DE BORDEAUX, Talence (FR); CENTRE NATIONAL DE LA RECHERCHE SCIENTIFIQUE (CNRS), Paris (FR); INSTITUT NATIONAL DE LA SANTE DE LA RECHERCHE MEDICALE, Paris (FR)

( * ) Notice: Subject to any disclaimer, the term of this patent is extended or adjusted under 35 U.S.C. 154(b) by 203 days.

(21) Appl. No.: 16/304,574

(22) PCT Filed: May 29, 2017

(86) PCT No.: PCT/EP2017/062925
§ 371 (c)(1),
(2) Date: Nov. 26, 2018

(87) PCT Pub. No.: WO2017/203064
PCT Pub. Date: Nov. 30, 2017

(65) Prior Publication Data
US 2019/0172202 A1    Jun. 6, 2019

(30) Foreign Application Priority Data

May 27, 2016   (FR) ..................................... 1654812

(51) Int. Cl.
*G06T 7/00* (2017.01)
*G06T 7/12* (2017.01)

(52) U.S. Cl.
CPC ............. *G06T 7/0012* (2013.01); *G06T 7/12* (2017.01); *G06T 2200/08* (2013.01);
(Continued)

(58) Field of Classification Search
CPC ..... G06T 7/0012; G06T 7/12; G06T 2200/08; G06T 2207/10088; G06T 2207/20044; G06T 2207/30061
See application file for complete search history.

(56) References Cited

U.S. PATENT DOCUMENTS

| | | | |
|---|---|---|---|
| 6,185,446 B1 * | 2/2001 | Carlsen, Jr. .......... | A61B 5/0873 250/458.1 |
| 8,233,964 B2 * | 7/2012 | Kiraly ...................... | G06T 7/11 600/425 |

(Continued)

OTHER PUBLICATIONS

International Search Report as issued in International Patent Application No. PCT/EP2017/062925, dated Oct. 13, 2017.
(Continued)

*Primary Examiner* — Jaime M Holliday

(74) *Attorney, Agent, or Firm* — Pillsbury Winthrop Shaw Pittman LLP

(57) ABSTRACT

An MRI method is disclosed for the geometrical characterisation of pulmonary airways on the basis of a first tridimensional image of at least one bronchus of a bronchial tree and includes: acquiring a first MRI image, an MRI sequence being synchronised with a respiratory frequency; filtering the first image; segmenting a portion of the filtered image including the contours of the bronchial tree and its inner volumetric portion; estimating at least one plane of cut of a bronchus; generating at least one image slice of a bronchus; estimating, for each image slice, an area contained within the bronchial wall and/or a bronchial wall thickness.

16 Claims, 4 Drawing Sheets

(52) U.S. Cl.
CPC .............. *G06T 2207/10088* (2013.01); *G06T 2207/20044* (2013.01); *G06T 2207/30061* (2013.01)

(56) References Cited

U.S. PATENT DOCUMENTS

| | | | |
|---|---|---|---|
| 2005/0107679 A1* | 5/2005 | Geiger | G06T 19/003 600/407 |
| 2005/0182295 A1* | 8/2005 | Soper | A61B 1/00172 600/117 |
| 2005/0187464 A1* | 8/2005 | Ho | A61B 5/055 600/428 |
| 2005/0240094 A1* | 10/2005 | Pichon | G06T 7/11 600/407 |
| 2007/0165917 A1* | 7/2007 | Cao | G06T 7/0012 382/128 |
| 2008/0273777 A1* | 11/2008 | Luboz | G06T 7/162 382/130 |
| 2012/0268450 A1* | 10/2012 | Kiraly | G06T 7/0012 345/419 |
| 2013/0006094 A1* | 1/2013 | Charles | A61B 5/7285 600/411 |
| 2013/0338489 A1* | 12/2013 | Prisk | A61B 5/055 600/420 |
| 2016/0334488 A1* | 11/2016 | Bieri | G01R 33/4824 |
| 2017/0254868 A1* | 9/2017 | Kimura | G01R 33/56545 |
| 2020/0093426 A1* | 3/2020 | Chang | A61B 5/7257 |

OTHER PUBLICATIONS

Kiraly, A. P., et al., "Three-dimensional Human Airway Segmentation Methods for Clinical Virtual Bronchoscopy," Academic Radiology, Elsevier, vol. 9, No. 10, Sep. 2002, XP002330892, pp. 1153-1168.

Kiraly, A. P., et al., "Virtual Bronchoscopy for Quantitative Airway Analysis," SPIE—Proceedings of the International Society for Optical Engineering, vol. 5746, Apr. 2005, XP055344262, pp. 369-383.

Dournes, G., et al., "Quiet Submillimeter MR Imaging of the Lung Is Feasible with a PETRA Sequence at $1.5T^1$," Radiology, vol. 276, No. 1, Jul. 2015, XP055344018, pp. 258-328.

Grélard, F., et al., "Precise Cross-Section Estimation on Tubular Organs," Network and Parallel Computing; [Lecture Notes in Computer Science; Lect. Notes Computer], Aug. 2015, XP047318506, pp. 277-288.

Grélard, F., et al., "Centerlines of Tubular Volumes Based on Orthogonal Plane Estimation," Network and Parallel Computing; [Lecture Notes in Computer Science; Lect. Notes Computer], Apr. 2016, XP047340058, pp. 427-438.

Cornea, N. D., et al., "Curve-Skeleton Properties, Applications, and Algorithms," IEEE Transactions on Visualization and Computer Graphics, vol. 13, No. 3, May/Jun. 2007, XP011191353, pp. 530-548.

Boskamp, T., et al., "Geometrical and Structural Analysis of Vessel Systems in 3D Medical Image Datasets," In: "vol. 5: Methods in Cardiovascular and Brain Systems," vol. 5, Jan. 2005, XP055104761, pp. 1-57.

Toriwaki, J., et al., "Chapter 1: Introduction," Fundamentals of Three-Dimensional Digital Image Processing, Jan. 2009, XP009500356, pp. 1-18.

\* cited by examiner

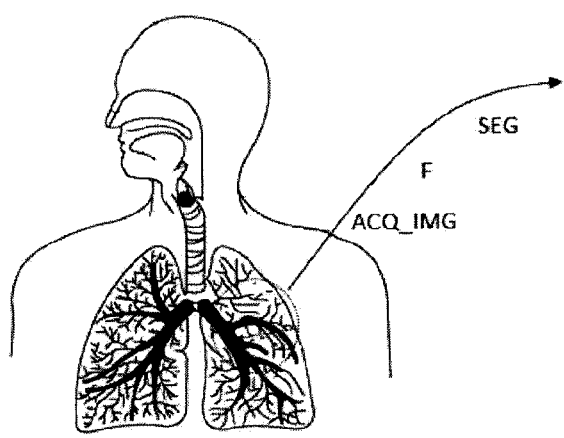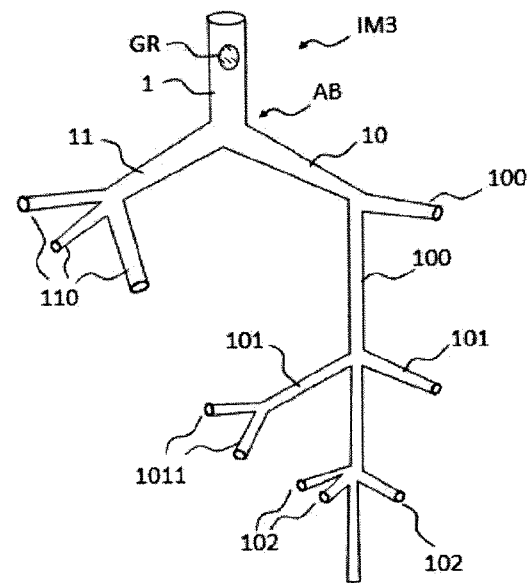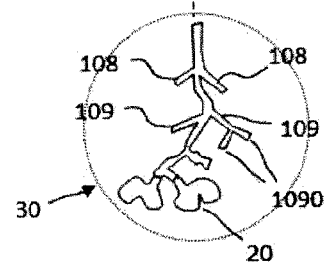
FIG.3　　　　FIG.4

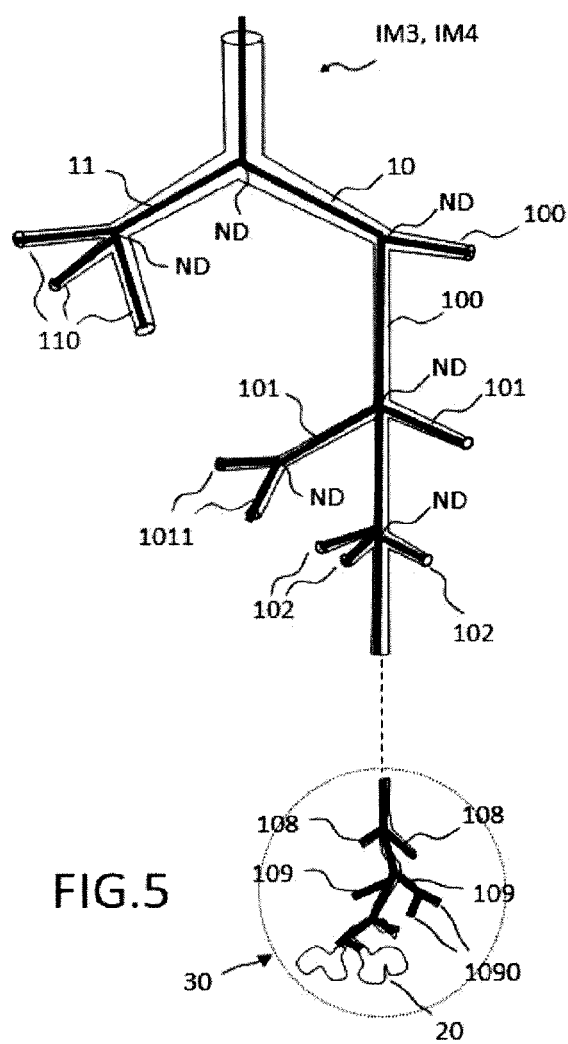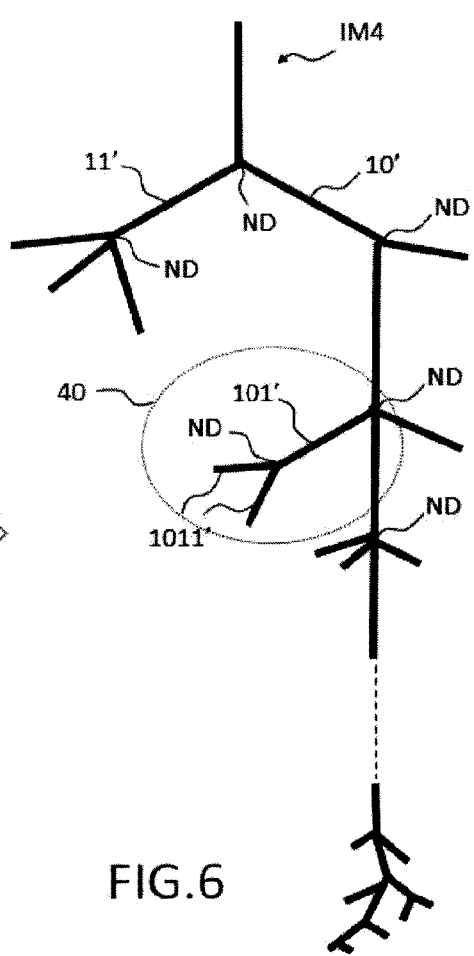

METHOD FOR GEOMETRICAL CHARACTERISATION OF THE AIRWAYS OF A LUNG BY MRI

CROSS REFERENCE TO RELATED APPLICATIONS

This application is the U.S. National Stage of PCT/EP2017/062925, filed May 29, 2017, which in turn claims priority to French Patent Application No. 1654812 filed May 27, 2016, the entire contents of all applications are incorporated herein by reference in their entireties.

FIELD

The field of invention concerns methods for processing images of the bronchial tree of the lung. In particular, the field of the invention relates to methods for geometrical characterisation of a three-dimensional image of the bronchial tree to extract intrinsic characteristics of a determined section of at least one bronchus. Finally, the field of the invention relates to the methods for processing images obtained from an MRI imaging system.

STATE OF THE ART

Various imaging techniques currently exist enabling images of the lung, and more specifically of the bronchial tree, to be acquired. A first advantage of obtaining such images is that it enables certain illnesses to be explored, such as: asthma, the chronic obstructive pulmonary disease (BPCO), lung cancer, mucoviscidosis, sleep apnea and occupational lung diseases. In addition, another advantage is that it enables its operation to be modelled, and images to be obtained for the purposes of scientific research. The study of the geometry of the bronchial tubes, of their 3D structures and their characteristics in a cross-section enables them to be characterised and classified.

Until now the imaging techniques used have been:
- "Thoracic Radiography", known by the French acronym "RT" or;
- computer-assisted tomography, designated by the French acronym "TDM" or "CTscan".

Despite the high quality of the images which they can provide, both these techniques have the disadvantage that they are irradiating imaging methods, which limits their repeated use, particularly in connection with the therapeutic monitoring of chronic pathologies. In addition, only the morphometric data is accessible in TDM or RT. The structural tissue data, such as the difference between inflammation and fibrosis, for example, is inaccessible using these imaging techniques.

In addition, due to the irradiation caused by these techniques, their uses for the purposes of studying the characteristics of the bronchial tubes, in particular to create cartographic models of the bronchial tree, or to extract referenced data from them for scientific studies are limited. In particular, when longitudinal studies, i.e. those undertaken over time, are conducted with repeated images, particularly with young subjects, children or adolescents, these studies can then be highly restricted.

SUMMARY OF THE INVENTION

The invention enables the above-mentioned disadvantages to be resolved.

One object of the invention relates to a method for geometrical characterisation from at least one first three-dimensional image of the airways by MRI for the geometrical characterisation of at least one bronchus of a bronchial tree, where the said method includes:
- acquisition of at least one first MRI image of a lung, where an MRI sequence is synchronised with a respiration frequency of a patient to acquire the said image;
- filtering of the first image to increase the signal-to-noise ratio;
- segmentation of a portion of the filtered image to generate a three-dimensional segmented image including the contours of the bronchial tree and its inner volumetric portion;
- estimation of at least one cross-section of a bronchus, where each cross-section is locally orthogonal to the said bronchus;
- Generation of at least one cross-section image, where each cross-section image includes a section of a bronchus;
- Estimation for each cross-section image:
  - of an area inside the bronchial wall of the cross-section image and/or;
  - of a bronchial wall thickness of the cross-section image.

One advantage is that an MRI image can be obtained which does not necessarily require a contrast product to be introduced into the body of a patient. Another advantage is that the images obtained have satisfactory resolution, due to the segmentation combined with the filtering step. Finally, synchronising the taking of the images with the respiration frequency enables acquisition over periods which enable a usable high-resolution image to be obtained.

According to one implementation the method includes skeletonisation of the segmented image to generate a skeleton containing a set of branches, where each branch is associated with one bronchus.

One advantage of this step is that it enables a model of the bronchial tubes to be created which facilitates the estimation of the cross-sections. The cross-section calculations require fewer memory resources and . . . .

According to one implementation, the MRI acquisition sequence is defined for ultra-short echo times, by an isotropic 3D acquisition of the image and a double acquisition in space of the frequencies of the information included in the received echoes combining:
- acquisition of a radially defined image in a region defining the periphery of a zone of interest;
- acquisition of a Cartesian image which is defined point-by-point in the zone of interest.

One advantage is that this optimises the number of calculations and the acquisition times, in particular in order to repeat the acquisition of three-dimensional images over longer periods.

According to one implementation the filtering of the first image is accomplished using a median filter and/or an anisotropic filter so as to obtain a filtered image.

One advantage of this is that it eliminates the noise of the acquired image in order to limit the errors, in particular in the segmentation step.

According to one implementation the filtering includes application of a filter combining colorimetric data and geometric data from the first image from at least one discrete estimator so as to obtain a filtered image.

One advantage of this is that it eliminates the noise of the acquired image in order to limit the errors, in particular in the segmentation step.

According to one implementation, the segmentation of a portion of the filtered image includes an implementation of a shape-recognition method using a mathematical morphology technique, in order to dissociate the tubular shapes from the remainder of the filtered image. This technique can be used with the assistance of one or a combination of mathematical morphology operator(s).

One advantage of the use of such a technique is that it allows improved recognition of tubular shapes, and therefore improved segmentation of the bronchial tubes.

According to one implementation, segmentation of all or part of the filtered image includes:
- selection of one or more voxels, called the seeds, and the definition of a tolerance threshold of a similarity criterion of a characteristic magnitude of voxels;
- automatic propagation of a zone of voxels included in the range of values of the predefined tolerance until at least one border is encountered, defined by a set of voxels the characteristic magnitude of which does not satisfy the similarity criterion;
- extraction of an extended zone of voxels to generate a segmented image.

One advantage of these steps is that the step of segmentation using the definition of a seed of the image is accomplished automatically. One advantage is also that they allow the tolerance thresholds to be configured according to the acquired image, the organ of the patient, and therefore the specific characteristics of their organs, and also the acquisition conditions or image processing software used. Finally, such a technique advantageously enables the presence or absence of a contrast agent modifying the colorimetry of the acquired image to be taken into account.

According to one implementation the following steps:
- selection of one or more voxels, and;
- automatic propagation of a zone of voxels, are accomplished several times in several zones of the filtered image until the extraction of an extended zone of voxels to generate a segmented image.

One advantage is that the image is segmented into portions by considering variations of nuances of the image. Thus, by considering parts of the image the predefined tolerance thresholds of the pixels or voxels can be defined more finely.

According to one implementation the segmentation includes a trimming of a zone of interest of the filtered image, where the zone of interest includes the 3D bronchial tree.

One advantage is to be able to focus or zoom in on the parts in the image which are of interest for processing, to limit computation times and the number of image processing operations.

According to one implementation the skeletonisation of the segmented image includes:
- construction of a Voronoi diagram from the segmented three-dimensional image, defining a plurality of Voronoi cells from a sample of points of the segmented image;
- determination of the covariance matrix of the Voronoi cells;
- generation of a set of branches obtained from the covariance matrix defining a skeleton.

One advantage of this skeletonisation is that it enables the number of calculations to be limited whilst defining sections normal to the tubular wall of each processed bronchus.

According to one implementation the skeletonisation includes an operation of homotopic thinning of the segmented image.

One advantage of this technique is that it enables the normal plane to be obtained directly from segments/curves obtained by the homotopic thinning operation.

According to one implementation, the estimation of a cross-section of a branch is produced locally at a selected point of the skeleton by:
- Selection of the Voronoi cells surrounding the current cell of the selected point:
- Measurement of the eigenvalues of each eigenvector defined between the selected point and a point of the adjoining cell;
- Selection of the two largest values of orthogonal eigenvectors;
- Generation of a cross-section aligned perpendicularly to the axis of the branch locally in the direction of one of the two eigenvectors.

One advantage of this implementation is that it uses the modelling used to generate the skeleton from the Voronoi cells to generate the cross-sections at the same time. This modelling therefore enables two results to be obtained, which can be used independently according to the application of the invention.

According to one implementation the estimation of a cross-section of a bronchus is made locally from the segmented three-dimensional image, where the estimation of a cross-section includes a definition of a set of Voronoi cells at points of the said segmented volume, and where a discrete estimator applied to the parameters of the Voronoi cells generates a cross-section which is locally orthogonal to the said volume.

One advantage of the solution is that it automatically generates the cross-sections from the segmented image without performing the skeletonisation step.

Another object of the invention relates to a system for three-dimensional segmentation of the airways of the lung.

The segmentation system includes an MRI imaging system and a respiratory synchronisation device enabling a sequence for acquisition of the MRI imaging system to be synchronised with the frequency of respiration of a patient, and where a computer and a memory enable the steps of the method of the invention to be implemented.

One advantage of such a system is that it enables images of a lung to be produced without a patient being administered with a contrast medium.

BRIEF DESCRIPTION OF THE FIGURES

Other characteristics and advantages of the invention will be seen clearly on reading the detailed description below, with reference to the appended figures, which illustrate:

FIG. 3: a diagrammatic representation of the bronchial trees of the lungs of a man;

FIG. 4: implementation of a step of segmentation of a portion of a bronchial tree obtained from a 3D image acquired by MRI of an area of a lung;

FIGS. 5 and 6: an example representation of a step of skeletonisation of the image segmented by the method of the invention;

DESCRIPTION

Acquisition of MRI Images

Figure 1:
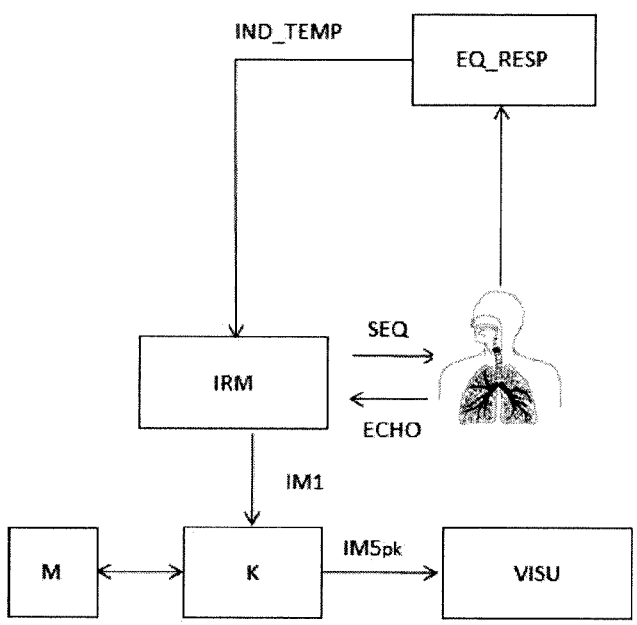
FIG. 1: a diagrammatic representation of the system of the invention, in particular enabling the acquisition of the MRI images to be synchronised with the respiratory movements of an individual.

The method of the invention includes a step of acquisition of an image by an MRI imaging system.

MRI is understood to mean either the system of imaging by MRI, or the image acquired by such equipment. It should be noted that MRI is a system of magnetic resonance imaging. Such equipment is known to those skilled in the art, and can be used by a practitioner familiar with such equipment.

The invention relates to the sequences of acquisition of three-dimensional images enabling a 3D image with a plurality of voxels to be obtained.

According to one implementation of the invention, a sequence of acquisition of at least one MRI image is defined to enable synchronisation of the said acquisition with the respiratory movements of a patient. Such synchronisation enables the movements of a lung of a patient to be taken into account, and a satisfactory image resolution to be obtained.

The MRI sequence includes the acquisition of a series of images. According to one implementation, the MRI sequence corresponds to a method of acquisition of the MRI image, which corresponds for example to the 3D+t mode. From this sequence a series of 3D images can therefore be extracted, from the various periods extracted from the respiratory synchronisation described below, as mentioned in FIG. 1.

According to one example, first image IM1 therefore corresponds to a 3D bronchial tree extracted at a given moment t, which can then be propagated to all the other 3D elements of the series.

To accomplish this a first characteristic of such a sequence is that it emits pulses, the echo time of which, called "TE", is said to be "ultra-short". These pulses and their echos are called UTE, for "Ultra Short TE".

The duration of an UTE of a sequence of the invention can be between several microseconds, therefore from 1 µs and several microseconds, i.e. around 10 µs.

A second characteristic of the sequence of acquisition of an MRI image is the acquisition of an isotropic 3D image. Various techniques known to those skilled in the art enable such an image to be obtained by means of an MRI. Among the known techniques we shall cite the following ones:

Siemens 5T TRUEFISP sequence;
Philips 3T BFFE WATSE sequence;
GE sequence.

A third characteristic of the acquisition sequences the combination of two acquisition modes in the frequencies space, called the "Fourier space". A first mode enables the acquisition of a radial image over a peripheral portion of the region of the acquired image. A second mode enables the acquisition of a Cartesian image, i.e. "point-by-point" in the area of interest.

Such an acquisition, which combines a radial image and a Cartesian image, enables improved processing and encoding of the data in very short time periods. In particular, this gain enables the UTE sequences which require processing of a large volume of data in very short periods to be used.

There is an MRI acquisition sequence known to those skilled in the art, called PETRA, an acronym which stands for "Pointwise Encoding Time reduction with Radial Acquisition", which combines an ultra-short TE and filling of the Fourier space, which is simultaneously radial and Cartesian.

Such a sequence enables the lung to be imaged with a sub-millimetric resolution, whilst retaining signal and contrast in the pulmonary parenchyma.

The images are acquired over periods ranging from a few minutes to several tens of minutes. As an example, an acquisition of a period of approximately 10 minutes with free respiration, with respiratory synchronisation, allows satisfactory resolution of the image.

Another advantage of the use of the acquisition of an MRI image with a previously defined sequence is that the method of the invention enables use of a contrast product to be avoided. Consequently, a patient is not forced to have a contrast product injected before the images are taken. Injection of a contrast product can also have deleterious effects (allergies, shocks, extravasation, nephrogenic fibrosis, accumulation in the basal ganglia, etc.) for the health of a patient.

Finally, a negative consequence of the use of a contrast product is that the image must be taken in a constrained time window, which imposes a particular imaging method on the patient. The invention enables this disadvantage to be resolved.

Finally, another advantage of the use of MRI acquisition is that this technique is non-irradiating. The physical principle is, indeed, to cause the hydrogen atoms to resonate in order to obtain functional, anatomic and metabolic images. Consequently there is no irradiation of the imaged regions.

Respiratory Synchronisation

Various equipment and techniques can be used to synchronise the MRI acquisition sequence with the respiration of a patient. One advantage of this synchronisation is to enable the MRI acquisition sequences to be controlled by the respiratory movements so as to stabilise image-taking, to acquire the image in a static coordinate, in which the lung returns to approximately the same position, to mitigate the irregular, parasitic effects of contractions and decontractions of the lung.

To do so a first synchronisation device including a respiratory balloon can be used. Such a device includes a belt which is intended to be attached to the thorax or abdomen of a patient. The balloon contracts and decontracts with the respiration. An indicator relating to the contraction state is regularly generated by the first synchronisation device and then transmitted to an MRI interface. The MRI includes a time datum taken from this lung contraction and decontraction indicator so as to mark, in terms of time, or to timestamp, instants when the acquisition sequence is fired.

According to another implementation, a second synchronisation device includes a system for imaging the diaphragm so as to generate an indicator of position, movement or opening of the diaphragm. According to one example implementation, the image of the diaphragm can be generated in 2D. This indicator enables time markers to be generated which control the acquisitions of MRI images. The second imaging system can be, for example, a browser enabling a deep image of the movements of the diaphragm to be produced.

General Diagram

FIG. 1 represents a diagram of a coupling of an EQ_RESP device sampling an IND_TEMP indicator related to the respiration of a patient in such a way that it controls an acquisition sequence of an MRI image. The synchronisation device enables a time indicator IND_TEMP to be generated to control the MRI acquisition sequence.

The MRI imaging system enables at least one pulse to be generated according to the acquisition sequence, and its echos ECHO to be acquired. The pulse of the sequence is noted SEQ in FIG. 1 and the image acquired in 3D is noted IM1 in FIG. 1. More specifically, image IM1 is reconstructed from a frequency measurement of the echos of the transmitted signal.

Such an image IM1 is processed by the method of the invention using a computer K and a memory M. Results $IM5_{p_k}$ of the processing by the method of the invention of the image acquired by MRI can be displayed on a screen noted VISU. Index p refers to selected bronchus $b_p$ and index k refers to a selected cross-section $p_k$ of selected bronchus $b_p$.

These results can take the form of images of sections of bronchial tubes, i.e. a 2D image, or the form of characteristic values of the bronchus in a cross-section, such as its internal area or the average thickness of the wall, etc.

Figure 2:
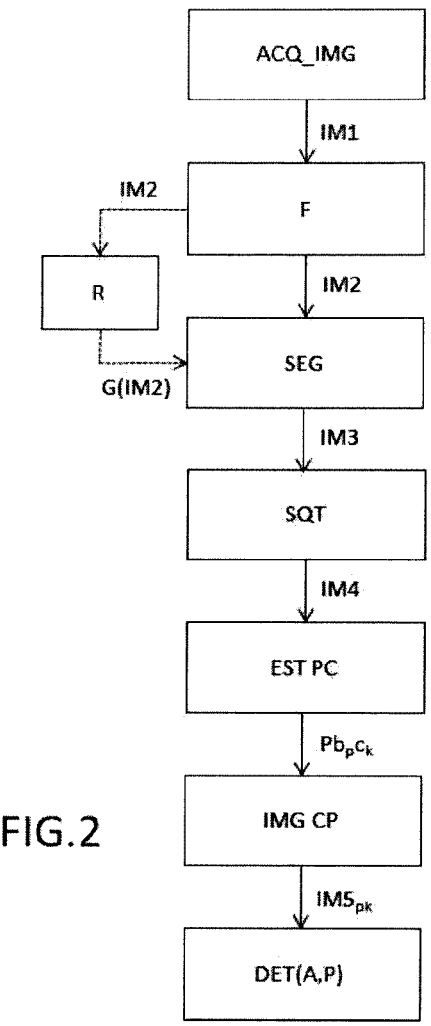
FIG. 2: an implementation of the method of the invention illustrating its main steps.

The method of the invention includes a plurality of steps which, when they are combined and executed, enable a chosen set of bronchial tubes of the bronchial tree of the lung to be characterised. FIG. 2 represents an example implementation of the method including a set of steps leading to the generation of values characteristic of a section of a bronchus and/or of 2D images of bronchial tube sections.

Acquisition of MRI Images

The first step of the method described above includes the acquisition of a three-dimensional image obtained using a given MRI sequence. This step is noted ACQJMG.

FIG. 3 represents the lungs of a man, where each contains a bronchial tree. The image acquired by MRI is not represented, but segmented image IM3 is represented in FIG. 4 after acquisition steps ACQJMG, filtering step F and segmentation step SEG have been performed.

One advantage of three-dimensional acquisition from an MRI is that the acquisition is performed directly in the Fourier plane, and therefore in 3D. This involves spherical filling, for example with the PETRA or 3D-UTE methods, or cylindrical, radial, or radial and cylindrical, or spiral, filling, etc.

One advantage of directly acquiring a 3D image instead of acquiring an image of 2D layers and then reconstructing using stacks of layers to generate a 3D image, is that a repetition of the centre of the Fourier space is then possible. Indeed, this centre contains the contrast of the image. By stacking the 2D sections, only a proportion of the sections pass through the centre, and it is therefore known that the MRI signal is insufficient to obtain an image of the intra-pulmonary airways. With a 3D mode, radial or point-by-point or spiral or multiple twisted firings, from the centre of the Fourier space, are possible. This 3D acquisition mode, cut at ultra-short echo times, therefore enables an image of the intra-pulmonary airways to be given tangible form.

Optionally, before performing a step of filtering, a step of windowing and of centring can be performed on acquired image IM1. Axial, coronal and sagittal 2D representations can be extracted from the 3D image.

Filtering Step, F

When the image is acquired by the MRI imaging system a first filtering step F is performed. One goal of this first filtering step is to increase the signal-to-noise ratio. This step enables a difficulty of using the MRI for imaging the pulmonary regions to be overcome. Indeed, MRI has not yet become established in pulmonary exploration, due to the small quantity of protons present in the lungs. This quantity of protons is, for example, ten times less than that of the other organs. Consequently, the signal-to-noise ratio of the images obtained is too to be able to be used directly.

Advantageously, the method of the invention enables a first filtering step to be performed, intended to improve the quality of the acquired image which is to be processed.

One of the difficulties overcome by the method of the invention is the question of applying a filter whilst retaining the contours of the fine structures defined by the bronchial tubes.

To this end, the filtering technique can include a median filter of the acquired image. A median filter can be, for example, an algorithm applied to the acquired image based on an analysis of the characteristic values of each voxel, considering the median value of the adjoining voxels of the voxel in question.

According to one implementation an anisotropic median filter can alternatively be applied to the acquired image. This anisotropic filtering in particular enables the crenellation effects to be eliminated, and reduces the fuzziness.

According to another implementation, which can be combined with one of the above filtering techniques, i.e. a median and/or anisotropic filter, the filtering step includes the application of a tubular shapes recognition filter. A tubular shapes recognition filter can be produced from a mathematical algorithm enabling the tubular shapes formed by the bronchial tubes to be recognised. Such a filter can be, for example, a morphological filter. A morphological filter is characterised in particular by an increasing and idem potent transformation on a lattice.

Alternatively, the tubular shapes recognition filter can be produced from one or more discrete estimators enabling the colorimetric and geometrical data of the acquired image to be processed.

These two approaches can also be combined to produce a tubular shapes recognition filter.

Regardless of the filters applied in the filtering steps according to the different variants of the invention, the filtered image obtained is noted IM2.

Filters can be applied successively or jointly, depending on the operations on the matrices of the characteristic values of the acquired voxels. The result of the filtering operations produces a filtered image IM2.

According to one implementation the filter is configured to increase the signal-to-noise ratio, and to mitigate specific artefacts of the MRI. In particular, the filter enables a dotted appearance of the image, due to an effect called "streaks", to be mitigated, and also enables the signal to be harmonised with the 3D image due to the enhancement artefacts related to the antennae, or conversely the absence of a signal related to the distance of the antennae, and to the 3D folding.

The filtering also attempts to make the contours clearer through enhancement of contours.

Segmentation Step

The method of the invention includes a third step, noted SEG, which enables filtered image IM2 to be segmented. The image obtained at the end of the segmentation step is noted IM3. A segmentation of image IM2 attempts to produce an image IM3 in which the delimitations of the bronchial tubes in the 3D space are cropped from the remainder of the image, and the internal space of the bronchial tubes is preserved.

Optionally, a step of trimming R of filtered image IM2 is performed before segmentation step SEG, to isolate a portion of the image which is to be processed. FIG. 2 represents such an optional step.

Segmentation SEG includes the selection of one or more seeds GR of image IM2. Seed GR can be a voxel or a set of voxels. The selection of a set of voxels allows the determination, for example, of a characteristic magnitude such as, for example, a characteristic average, or a characteristic standard deviation with regard to an average or median value. This characteristic magnitude enables, for example, a tolerance threshold of a criterion of similarity to be determined for analysis of the adjoining voxels of the initial seed.

According to a first implementation, seed GR can be selected by an operator by selecting a voxel from an image, for example by means of a pointer. According to a second implementation, seed GR can be selected automatically, either in a predetermined region of the bronchial tree, by an algorithm defining a region of interest to select a seed, or according to a criterion for the average value of a level of grey of voxels distributed over a given region.

Segmentation SEG includes the gradual propagation of a selection of voxels, considered as roughly "close" to an adjoining voxel according to a criterion of similarity. The criterion of similarity can be based on a criterion of brightness, contrast, colour, saturation or shade, or a combination of these criteria. Thus, segmentation step SEG enables a volume of the image to be extracted to be defined. The gradual propagation relies on a comparison of a value of a criterion of similarity of a voxel with a predefined tolerance value. One interest of such segmentation SEG is to extract the part of image IM3 relating only to the bronchial tubes from the remainder of the image.

One advantage of this segmentation step is that it enables all or part of the image corresponding to the vessels of the bronchial tubes of the generated image to be removed. Indeed, the vessels have imaging properties during MRI acquisition which are different from the aerated portions of the bronchial tubes. It is thus possible to display the sections of the vessels in the cross-section generated by the method of the invention.

The result of a segmentation step SEG is represented in FIG. 4. An image IM3 illustrates various bronchial tubes extracted from image IM2, the contours of which are cropped. Segmentation of bronchial tree AB or a portion of this tree leads to the generation of an image IM3. Segmented image IM3 includes the contour and volume of the main bronchus, together with all the bronchial tubes which are roughly tubular in shape, and their internal volumes.

Segmentation can be initiated automatically by an algorithm able to detect general shapes and choose a seed GR of the trachea, i.e. of an upper part of bronchial tree AB, the section of which is larger than that of the other bronchial tubes. This part of bronchial tree AB enables satisfactory propagation of the segmentation operation, and provides a starting point for the segmentation operation facilitating gradual comparison of the voxels.

In an alternative manner, a seed can be selected manually by an operator.

FIG. 4 represents a seed GR in the trachea, i.e. the main bronchus of bronchial tree AB.

According to other implementations, the seed can be determined in another portion of bronchial tree AB.

According to a variant implementation, seed GR is defined in the part of the image away from the voxels of bronchial tree AB; the extracted image is then the complementary image of the segmented bronchial tree. In this case bronchial tree AB is obtained by an operation to subtract the image extracted from the total image.

Segmented image IM3 of FIG. 4 includes the main bronchus, the trachea, noted 1. If seed GR is determined in the trachea, secondary bronchial tubes 10, 11 are then segmented gradually, due to the propagation of the segmentation mechanism. Segmentation is propagated gradually in order to extract also 3rd order bronchial tubes 110 and 110. The segmentation step continues with one of the 3rd order bronchial tubes, noted 100, with the representation of 4th order bronchial tubes 101, 102 and 108, 109, and so forth until sufficient segmentation of bronchial tree AB is obtained to determine a geometrical characterisation of the bronchial tree.

In certain cases the segmentation of bronchial tree AB can continue as far as the 5th order bronchial tubes: 1011, 1090, and even, in rare cases, as far as terminal bronchioles 20 of lobule 30 when their dimensions are greater than the dimension of a voxel.

According to one implementation of the invention, it is possible to apply the segmentation only to a portion of bronchial tree AB. According to one implementation, the propagation can be adjusted according to the order of the bronchial tubes, in order to stop propagation automatically at an order of bronchial tubes.

It should be noted that a step of segmentation could be applied equally well to a 2D image as to a 3D image, as described above. Segmentation of a 2D image is, in particular, a possible operation to extract the wall of a bronchus in a cross-section determined in the next stages of the method.

Skeleton Isation Step

The method of the invention includes a step noted SQT, represented in FIGS. 5 and 6, intended to generate a curvilinear skeleton from segmented image IM3. The skeleton includes a set of branches. The image obtained at the end of the skeletonisation step is noted IM4. FIG. 5 represents the segmented image and the skeleton; FIG. 6 represents only the skeleton. Only a few branches of the skeleton are annotated, including in particular branch 11', derived from bronchus 11, branch 10', derived from bronchus 10, branch 101', derived from bronchus 101', and branches 1011', derived from bronchial tubes 1011.

During the skeletonisation step, according to a preferential implementation, the branches of the bronchial skeleton are defined in the centre of the cylinders defined by the volumetric bronchial tubes of image IM3. FIG. 5 represents a diagrammatic representation which does not faithfully represent the centring of the branches in each cylinder as a consequence of the diagrammatic representation.

According to this representation, a bronchus between two successive nodes ND is given the tangible form of a branch. A node ND is understood to be an intersection between a mother branch and its daughter branches, or alternatively as the intersection of branches of two successive orders of branches, such as, for example, the intersection between a 3rd order branch and a 4th order branch.

Alternatively, a variant implementation to obtain skeleton IM4 can be obtained using an algorithm based on a homotopic thinning technique.

All other curvilinear skeletonisation algorithms can be used by the invention.

Alternative to the Skeletonisation Step

According to one implementation, skeletonisation operation SQT is not performed. In this latter case the cross-sections are calculated directly from three-dimensional segmented volume IM3. The three-dimensional segmented volume includes a set of tubular shapes defining the bronchial tubes modelled in image IM3.

In this latter case, covariance measurements are calculated on basis of the definition of the Voronoi cells defined by the segmented volume, i.e. the bronchial tree obtained in image IM3. The covariance measurement includes a calculation of the eigenvalues and eigenvectors of the covariance matrix associated with the cells.

Step of Estimation of the Cross-Sections with Skeletonisation

The step of estimation of cross-sections EST PC can be performed jointly with skeletonisation operation SQT. Typically, this operation can follow naturally from the smoothing operation or operation to generate tangents at the branches of the skeleton at determined points, for which a cross-section is desired.

According to one example, three points for each branch can be chosen, defining them with a distribution for the said branch. This selection of points can be made manually or automatically, by applying an algorithm for determining points for each branch. According to other examples, a plurality of points can be defined for each branch, with a predetermined distribution for the said branch.

A first technique consists in estimating the tangents for portions of interest of the skeleton, for which at least one cross-section is defined. The portions of interest can be defined by determined points of the branch. In this case two points separated by a certain percentage of the length of the branch define a portion of the branch.

A second technique consists in applying an estimator to the Voronoi cells defined by the points of the skeleton. Such an estimator enables a cross-section to be extracted from the selection of a Voronoi cell defined by the skeleton. For example, the cross-section can be extracted by keeping the two eigenvectors of highest eigenvalues of each cell. A precise estimate of the cross-section orthogonal to the bronchus can be deduced from these two eigenvectors.

Another advantage is that a skeleton centring function is obtained, which facilitates the successive operations of generation of cross-section EST PC This operation of estimation of at least one cross-section can be implemented jointly after the skeletonisation obtained using the Voronoi cells defined during the skeletonisation operation.

Figure 7:
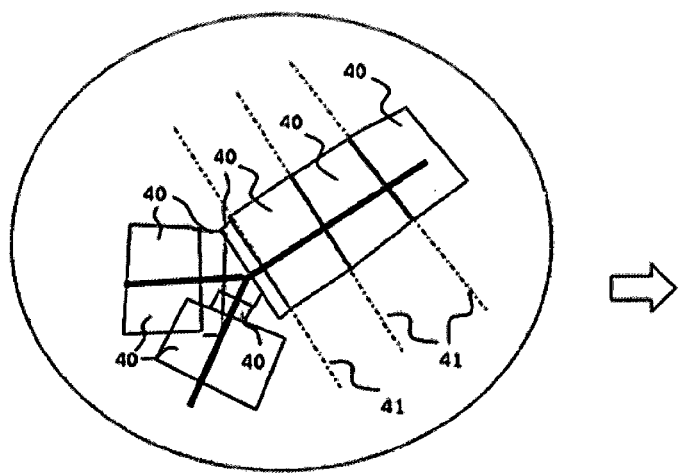
FIG. 7: an example of determination of a set of cross-sections of the skeleton of the bronchial tree obtained by the method of the invention.
Figure 8:
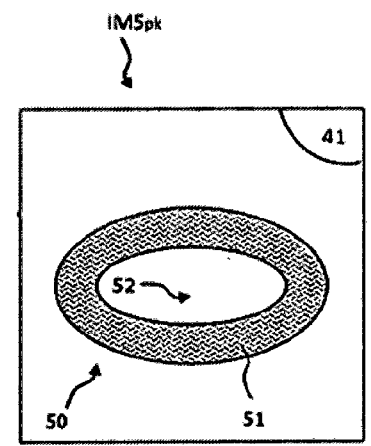
FIG. 8: a cross-section of a bronchus obtained by the method of the invention.

FIG. 7 represents an example implementation of the generation of a set of Voronoi cells 40 on a portion of the skeleton obtained by the method of the invention. It will be understood that Voronoi cells 40 enable cross-sections 41 to be extracted naturally from the eigenvectors defined by the contours of the said cells.

When estimating a cross-section $p_k$ of a bronchus $b_p$ from a skeleton generated by the method of the invention, it is possible to average a set of localised cross-sections in order to reduce the isolated orientation errors of certain estimated cross-sections. In this case the orientation errors of an estimated cross-section can be detected more simply by comparing the cross-sections in the area close to the estimated cross-section.

Step of Estimation of the Cross-Sections without Skeletonisation

An alternative technique consists in estimating directly from segmented image IM3 an approximation of a cross-section at the bronchus of the segmented image. In this latter case, as seen above, a set of voxels of a bronchus defines volumetric curve. The Voronoi cells are then defined in segmented volume IM3.

A discrete estimator can use the Voronoi cells generated by points of image IM3 to estimate the orthogonal sections of the bronchial tubes in a region of interest. The region of interest can be determined automatically, or by selecting a point of the bronchial tree to determine a cross-section including the selected point.

Constructing the Image in a Cross-Section

Using the cross-sections, the method of the invention enables the portion of the 2D image included in the cross-section intercepting the segmented image to be extracted; this step is noted IMG CP. The image is then reconstructed in this orthogonal cross-section so as to display a section of a bronchus 50 enabling the measurements of wall 51 of a bronchus, and its internal area 52 to be obtained.

An operation to segment the bronchial wall using an operator of the Laplacian of Gaussian type can be used.

A technique comparable to the selection of a seed by manual or automatic selection of pixels of the 2D image enables the annular portion of the bronchus forming wall 51 to be cropped. Such an algorithm can be similar to that of the 3D segmentation described above. Propagation of a zone of the 2D space from a selection of a seed enables a contour of the wall of the bronchus in the cross-section to be obtained, and geometrical properties to be extracted from it.

In the same way, a criterion of similarity is determined to devise a rule for gradual propagation from the seed. The criterion of similarity can be based on a criterion of colour, contrast, saturation, shade or brightness, or a combination of these criteria. A tolerance threshold enables the pixels/voxels selection zone satisfying the criterion to be propagated gradually, by comparison with a predefined tolerance value. The general shape can then be extracted from a 2D segmentation operation.

A shape recognition algorithm can be jointly applied, to optimise the segmentation of the wall of the bronchus in the 2D image of the cross-section.

When the bronchial wall has been segmented it is therefore possible to estimate its area, and the area of the light in the bronchus. Average values of the thickness of the wall over all or a portion of the cross-section can be obtained. An estimation of the general shape of the light of the bronchus also enables the bronchus to be characterised in terms of whether the shape is similar to a circle, an ellipse or a point.

The method of the invention therefore enables characteristic values of bronchial tubes of the bronchial tree to be obtained, without irradiating the patient. In addition, bearing in mind the possible synchronisation between the respiratory frequency and the MRI acquisition sequence, a level of image resolution can be obtained which makes this method into an alternative preferable to other imaging systems. Such a method enables a spatial resolution of the order of 0.7 to 1 mm$^3$ to be obtained.

Finally, the method of the invention enables a compromise to be reached between a sought image resolution and an obtained contrast which depends on the acquisition duration.

The invention claimed is:

1. A method for geometrical characterisation from at least one first three-dimensional image of the airways by MIII for the geometrical characterisation of at least one bronchus of a bronchial tree, the method comprising:
   directly acquiring by MRI at least one first three-dimensional MRI image of a lung of a patient, where an MRI acquisition sequence of said at least one first three-dimensional MRI image is defined to enable synchronisation of the direct acquisition of said at least one first three-dimensional MRI image with respiratory movements of the patient such that, during said direct acquisition and during said respiratory movements, an MRI image acquisition is launched each time the lung of the patient returns to a same position;
   filtering the first three-dimensional MRI image to increase the signal-to-noise ratio;
   segmenting a portion of the filtered image to generate a three-dimensional segmented image including the contours of the bronchial tree and its inner volumetric portion;

estimating at least one cross-section of a bronchus, where each cross-section is locally orthogonal to said bronchus;

generating at least one cross-section image, where each cross-section image includes a section of a bronchus;

estimating for each cross-section image:
    an area included inside the bronchial wall of the cross-section image and/or;
    a bronchial wall thickness of the cross-section image, wherein the MRI acquisition sequence is defined for ultra-short echo times and includes acquisition of a plurality of MRI images that are obtained by an isotropic 3D acquisition of image data in the Fourier 3D space from a center of the Fourier 3D space so as to obtain a repetition of the center of the Fourier 3D space during image acquisition.

2. The method according to claim 1, further comprising:
a skeletonisation of the segmented image to generate a skeleton including a set of branches, where each branch is associated with a bronchus.

3. The method according to claim 2, wherein the skeletonisation of the segmented image includes:
    construction of a Voronoi diagram from the segmented three-dimensional image, defining a plurality of Voronoi cells from a sample of points of the segmented image;
    determination of the covariance matrix of the Voronoi cells;
    generation of a set of branches obtained from the covariance matrix defining a skeleton.

4. The method according to claim 2, wherein the skeletonisation includes an operation of homotopic thinning of the segmented image.

5. The method according to claim 2, wherein the estimation of the cross-section of a branch is accomplished locally in a selected point of the skeleton by:
    selection of Voronoi cells surrounding the standard cell of the selected point:
    measurement of the eigenvalues of each eigenvector defined between the selected point and a point of the adjoining cell;
    selection of the two largest values of orthogonal eigenvectors;
    generation of a cross-section aligned perpendicularly to the axis of the branch locally in the direction of one of the two eigenvectors.

6. The method according to claim 1, wherein the MRI acquisition sequence includes a double acquisition in the Fourier 3D space of the frequencies of the information included in the received echoes combining:
    acquisition of a radially defined image in a region defining the periphery of a zone of interest;
    acquisition of a Cartesian image which is defined point-by-point in the zone of interest.

7. The method according to claim 1 wherein the filtering of the first image is accomplished using a median filter and/or an anisotropic filter so as to obtain a filtered image.

8. The method according to claim 1, wherein the filtering includes application of a filter combining colorimetric data and geometric data from the first image from at least one estimator so as to obtain a filtered image.

9. The method according to claim 1, wherein the segmentation of a portion of the filtered image includes an implementation of a shape-recognition method using a mathematical morphology technique, in order to dissociate the tubular shapes from the remainder of the filtered image.

10. The method according to claim 1, wherein the segmentation of all or a portion of the filtered image includes:
    selection of one or more voxels, called the seeds, and the definition of a tolerance threshold of a similarity criterion of a characteristic magnitude of voxels;
    automatic propagation of a zone of voxels included in the range of values of the predefined tolerance until at least one border is encountered, defined by a set of voxels the characteristic magnitude of which does not satisfy the similarity criterion;
    extraction of an extended zone of voxels to generate a segmented image.

11. The method according to claim 10, wherein:
    selection of one or more voxels, and;
    automatic propagation of a zone of voxels,
are accomplished several times in several zones of the filtered image until the extraction of an extended zone of voxels to generate a segmented image.

12. The method according to claim 1, wherein the segmentation includes a cropping of a zone of interest of a filtered image, where the zone of interest includes the bronchial tree in 3D.

13. The method according to claim 1, wherein the estimation of a cross-section of a bronchus is made locally from the segmented three-dimensional image, where the estimation of a cross-section includes a definition of a set of Voronoi cells at points of a segmented volume associated with the three-dimensional segmented image, and where a discrete estimator applied to the parameters of the Voronoi cells generates a cross-section which is locally orthogonal to said volume.

14. The method according to claim 1, wherein the synchronization is carried out to mitigate irregular, parasitic effects of contractions and decontractions of the lung.

15. The method according to claim 1, wherein the synchronization is carried out to acquire the at least one first three-dimensional MRI image in a static coordinate.

16. A system for three-dimensional segmentation of the airways of the lung, comprising an MRI imaging system and a respiratory synchronisation device enabling a sequence for acquisition of the MRI imaging system to be synchronised with the frequency of respiration of a patient, and where a computer and a memory enable the steps of the method of claim 1 to be implemented.

* * * * *